(12) United States Patent  
Weber et al.

(10) Patent No.: US 8,256,480 B1  
(45) Date of Patent: Sep. 4, 2012

(54) COUPLING APPARATUS FOR POSITIONING COMPONENTS IN WORKPIECE INTERIOR AND METHOD OF USING SAME

(75) Inventors: Wolfgang Weber, Windsor (CA); Cory Lane, Kingsville (CA); Boris Novakovic, Windsor (CA)

(73) Assignee: SPM Automation (Canada) Inc., Windsor, Ontario (CA)

( * ) Notice: Subject to any disclaimer, the term of this patent is extended or adjusted under 35 U.S.C. 154(b) by 0 days.

(21) Appl. No.: 13/067,422

(22) Filed: Jun. 1, 2011

(51) Int. Cl.  
*B32B 37/00* (2006.01)

(52) U.S. Cl. ...... 156/359; 156/378; 156/581; 156/583.1

(58) Field of Classification Search .................. 156/359, 156/378, 499, 580, 581, 583.1  
See application file for complete search history.

(56) References Cited

U.S. PATENT DOCUMENTS

| 5,614,118 | A | 3/1997 | Weber |
| 6,313,440 | B1 | 11/2001 | Weber |
| 6,491,786 | B2 * | 12/2002 | Moench ..................... 156/583.1 |
| 8,007,612 | B2 | 8/2011 | Oxenfarth |

* cited by examiner

*Primary Examiner* — James Sells

(57) ABSTRACT

A component coupling apparatus for mounting a component to an internal contact surface of a hollow workpiece which includes a positioning unit and at least one component holding unit. The component positioning unit includes a processor having memory which pre-stores data representative of a workpiece target feature and an access opening therein. The component positioning unit includes a 3D laser scanner/digitizer which is movable to scan the exterior surface of the workpiece and identify the axial centers of the access opening and target feature, and calculate the distance and/or directional vector therebetween. The component holder unit includes component holder supported on a support arm. The component holder releasably secures the component to be joined to the workpiece, and is sized for insertion at through the access opening to move the component into alignment with the contact surface. The processor controls movement of the carrying arm in directional movement in relation to the scanned distance between the access opening and the target feature, by providing control signals to a robot used to selectively activate position the component holder in response to identified and triangulated relative distances between the access opening and target features.

21 Claims, 8 Drawing Sheets

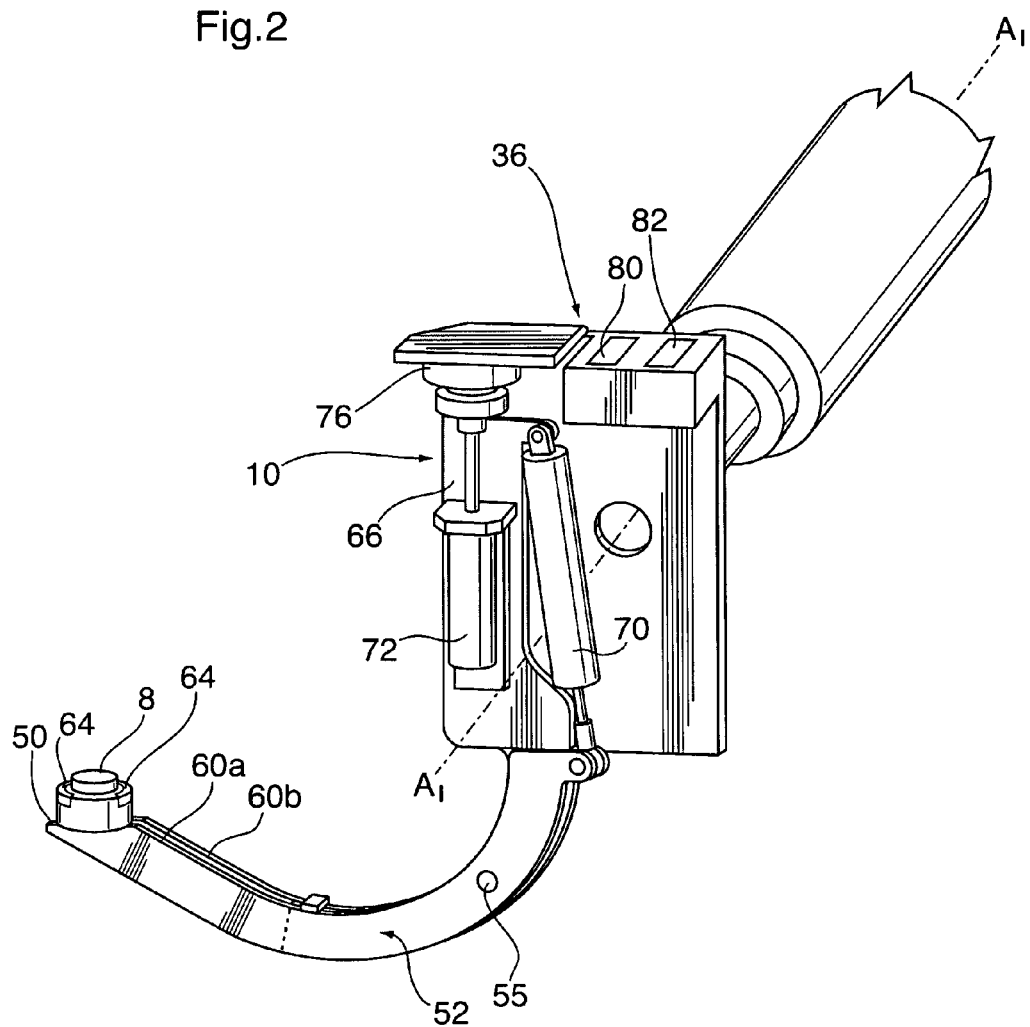

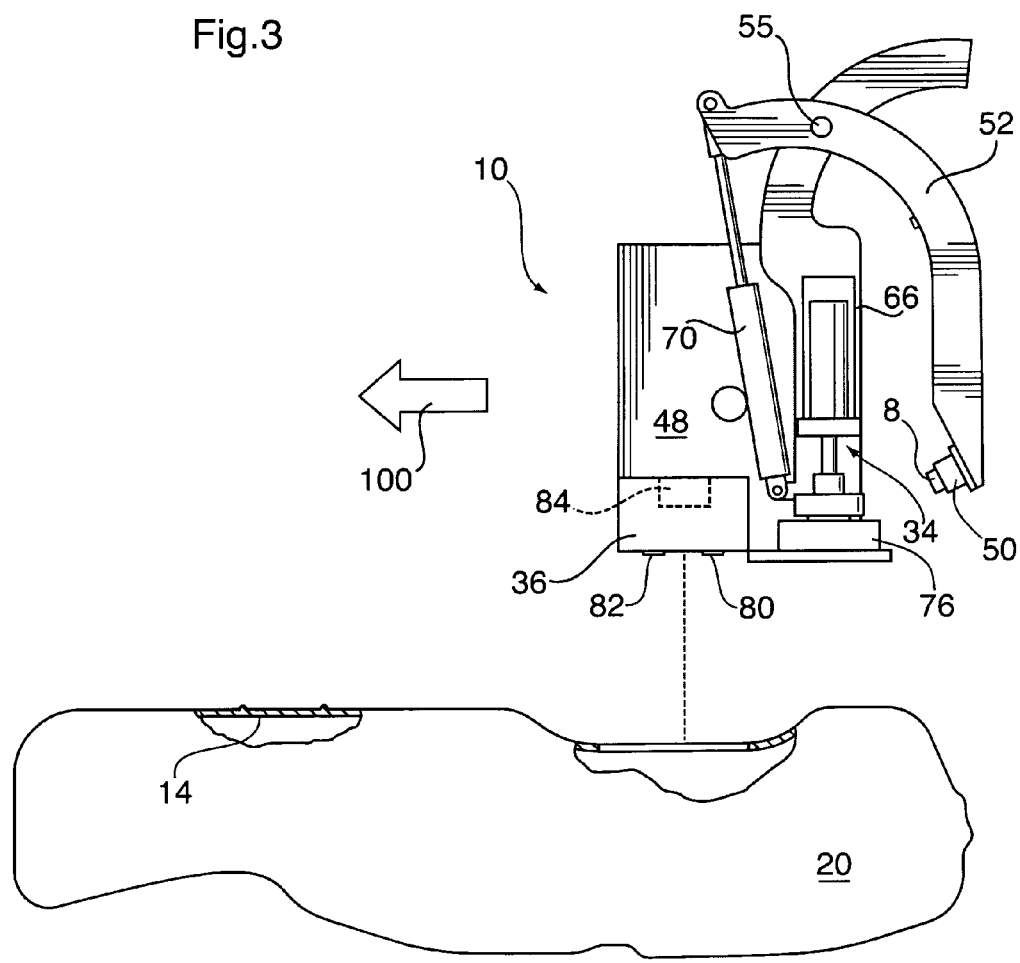

COUPLING APPARATUS FOR POSITIONING COMPONENTS IN WORKPIECE INTERIOR AND METHOD OF USING SAME

RELATED APPLICATIONS

This application is related to the applicant's co-pending U.S. patent application Ser. No. 12/929,722, entitled "Hot Plate Welding System", and which was filed in the United States Patent Office on 11 Feb. 2011.

SCOPE OF THE INVENTION

The present invention relates to a component positioning apparatus for mounting of workpiece components, and its method of use in the automated positioning and/or securement a component to predetermined contact surfaces disposed along an interior of a hollow workpiece. More preferably, the invention relates to a hot plate welding system operable to partially melt and join components and workpieces made of thermoplastics or other heat fusible materials in the production of finished articles.

BACKGROUND OF THE INVENTION

Hot plate welding systems are known for heat welding various types of components, such as plastic seal plugs, filler necks, brackets, vent nipples and the like to thermoplastic workpieces such as fluid reservoirs and gas tanks. Typically, conventional hot plate welding systems incorporate a hot plate which operates by thermal contact to melt part of the component and/or the workpiece to a partially melted or softened state. After partial melting, the component and workpiece are moved in to physical contact and allowed to cool and fuse to attach a particular component to a gas tank, fluid reservoir or other desired finished article.

More recently, it has become desirable to mount various types of components along the interior sidewall of hollow formed workpieces. Heretofore, however, the accurate positioning and mounting/heat fusing of components to interior contact surfaces has presented challenges in ensuring that the component is accurately located at the desired position within the workpiece interior.

In one conventional manufacturing process, workpieces are formed as a two-piece construction consisting of upper and lower halves. Prior to final assembly and the joining of the workpiece halves, the selected components are pre-mounted to desired interior contact surfaces of one or both halves, and the correct component positioning is verified optically. After validation, the workpiece halves, with the components pre-mounted thereto, are then fused together along their respective edges by heat or vibration welding to form the finished article. Such manufacturing processes, however, suffer the disadvantage that the composite finished article may be subject to premature failure by reason of the partial separation of the joined seams.

SUMMARY OF THE INVENTION

Accordingly, one object of the present invention is to provide an improved system and method for accurately mounting and/or coupling a component to a contact surface which is disposed along an interior portion of a hollow formed workpiece.

Another object of the invention is to provide an apparatus and method for ensuring the accurate heat melting and/or mounting of a component to a preselected contact surface along an interior of a blow molded thermoplastic or thermoplastic composite workpiece, such as a fuel tank or other fluid or coolant reservoir preform.

A further object of the invention is to provide a hot plate welding system for the accurate melting and/or mounting of thermoplastic components to an interior contact surface of a hollow blow molded workpiece, and wherein the position of the interior contact surface is determined in relation to one or more optically identified features provided on the workpiece exterior.

In one possible manufacturing method, a desired thermoplastic preform or workpiece is initially formed by injection, press or more preferably blow molding. The mold used in workpiece production is configured to integrally form a three dimensional target feature within a top or exterior surface of the workpiece, and which is provided in a predetermined spatial relationship to a contact surface against which a selected component is to be mounted. Although not essential, where the contact surface is provided along an interior side of the workpiece sidewall, the target feature is most preferably in direct alignment with a central position of the contact surface.

In one simplified manufacturing method, the contact surface may comprise a geometrically shaped recess which is molded directly into the workpiece sidewall, and wherein the target feature is provided as a co-axially aligned and complimentary shaped protrusion which projects outwardly from the sidewall exterior. In such an arrangement, the interior recess may optionally be provided with molded lips, ribs, clips or other mechanical features which are adapted to engage and retain a component end preformed with a complimentary shape thereto in a snap, mechanical or friction fit arrangement, and without requiring heat or chemical bonding.

In an alternate manufacturing process, the workpiece is formed by blow molding having a hollow interior and a substantially continuous or integral sidewall. An access opening is formed through the sidewall leading to the workpiece interior, spaced a desired distance from the contact surface against which the desired component is to be mounted. Although not essential, most preferably the contact surface is provided along the interior of a common side of the workpiece sidewall with the access opening. The target feature is most preferably formed as a three-dimensional recess of projection which is integrally molded directly into the exterior surface of the workpiece sidewall, and more preferably is formed as a raised boss, or a geometrically shaped protrusion. In one possible arrangement, the target feature is provided as a raised circular ring which has its radial center axially aligned with a central portion of contact surface.

To at least partially achieve at least some of the foregoing objects, a component coupling apparatus is provided which includes a positioning unit and at least one of a component holding unit and/or a workpiece melting unit. The component positioning unit is provided with an internal or external processor having memory which pre-stores data representative of the target feature and preferably also the access opening. The component positioning unit is further provided with an optical scanner, preferably a three-dimensional scanner, and most preferably a 3D laser scanner/digitizer which is operable to move over and/or scan at least part of the exterior surface of the workpiece. In this regard, the optical scanner may be provided with an offset camera for both identifying and triangulating the relative distances between the access opening and the target feature. In a most preferred mode of operation, the 3D scanner/digitizer and positioning unit operates with the processor to identify the approximate axial centers of each of the access opening, and the axial centre of the target feature, and calculate the distance and/or directional vectors therebetween.

The component holder unit is provided with a component holder which is supported in movement on a component holder carrying or support arm. The component holder is operable to releasably secure and transport in movement a selected component to be jointed to a workpiece. The component holder is sized for insertion at least partially through the access opening to move a selected component into the workpiece interior to a mounting position in general alignment with the contact surface.

In one possible construction, the hot plate welding unit includes at least one hot plate carried in movement on a hot plate holding arm. The hot plate and at least part of the hot plate welding arm are likewise sized and configured for at least partial insertion into the workpiece interior through the access opening to a start melt position, in which the hot plate is moved adjacent the contact surface, so as to be selectively movable thereagainst to partially melt and soften the contact surface.

Although not essential, the processor is preferably used to control movement of at least one and preferably both the component holder carrying arm and the hot plate holding arm in directional movement in relation to the scanned distance between the access opening and the target feature. The apparatus may be provided as part of a robotic hot plate welding system which is operable to heat fuse the component to the workpiece contact surface. The 3D camera/digitizer includes an internal processor and memory which is provided in electronic communication with an external processor provided as part of a system central processing unit (CPU) consisting of a robot controller and a programmable logic controller (PLC). The CPU is configured to receive data signals from the 3D camera/digitizer representing the scanned external surface features of the workpiece. The CPU in turn provides directional control signals to move the robot to selectively activate one, and most preferably both, the component holder carrying arm and hot plate holding arm to position the component holder and hot plate in response to identified and triangulated relative distances between the access opening and target features.

In a preferred method of use, hollow workpieces are formed using conventional blow molding apparatus. In the blow molding operation the target ring is integrally formed in the workpiece exterior with its axial centre in direct coaxial alignment with the interior contact surface to which the component is to be mounted.

Following manufacture, a selected workpiece is positioned on an assembly line which incorporates at least one component coupling apparatus. Because the positioning unit of the component coupling apparatus determines the final positioning of both the access opening and the location of the target ring relative to the access opening, the workpiece may be placed within the assembly line without the necessity of ensuring its precise initial alignment relative to the component positioning apparatus.

Following initial placement of the workpiece, the positioning unit is activated and the laser scanner incorporating the offset 3D camera/digitizer is moved over the workpiece exterior so as to pass over the access opening and target ring. The 3D camera/digitizer may be initially moved along a preselected path or base line by way of a gantry, or more preferably by its mounting on a movable robot arm. As the laser scanner is moved, the offset camera records the geometric features of the sidewall exterior. The scanned features are digitized and communicated to the processor. The processor in turn compares and identifies the geometric features of the access opening and target feature to the pre-recorded surface features stored in the CPU memory. As each of the access opening and target features are recognized, the CPU logs both their location, their geometric centers and the relative distance therebetween. In one preferred mode of operation, the deviation of the target ring center from the preselected path of movement is stored in the CPU.

Preferably the CPU is also used to control the movement of the robot arm to actuate the component holder arm and the component holder in movement to move the component into mounting position generally aligned with the contact surface feature in response to calculate distance and vector coordinates received from the laser scanner. Either following or simultaneously with the movement of the optical laser scanner, the robot arm is actuated to move the component holder together with a component releasably secured therein into the workpiece interior via the access opening. The component holder is moved into the workpiece interior to orient the component in the mounting position. Once aligned with the contact surface, the CPU is used to activate part of the component holding unit or the robot arm itself brining the component into juxtaposed contact with the contact surface to couple it thereto. In one mode of operation, the component holder support arm is actuated in sliding movement to move the component holder axially against the contact surface, coupling the component thereto in the desired position by mechanical, adhesive or melt fused contact.

Following component positioning, the component is released and the component holder and holder arm are moved axially away from the component. The CPU then actuates the robot to affect the withdrawal of the component holder and component holder support arm from the workpiece interior via the access opening in a reverse path of movement.

Although not essential, in an alternate embodiment immediately following or simultaneously with optical scanning and prior to the positioning of the component, the CPU operates to move the hot plate into the workpiece interior to partially melt the contact surface for the heat fusing of the component thereto. In particular, in dependence on the distance and vector data received from the optical laser scanner, the CPU is operated to control the positioning of the hot plate and hot plate holding arm, so as to move into the workpiece interior via the access opening. The hot plate and hot plate holding arm may be provided for movement on the same robot as the component holder unit, or in a less preferred arrangement may be movably mounted on their own second dedicated robot which is independently, more preferably commonly controlled by a single CPU. The hot plate is thus moved via the access opening into alignment with the sensed axially center of the target ring in a pre-melt position. Following positioning in the pre-melt position, the hot plate holding arm is moved forwardly to reposition the hot plate into juxtaposed contact against the contact surface, to effect its softening and/or partial melting. Following partial melting, the hot plate is returned, and the CPU is used to actuate the robot to effect the withdrawal of the hot plate and hot plate welding arm from the access opening in a reverse path of movement.

Accordingly, in one aspect the present invention resides in a component coupling system for connecting a component to a contact surface of a hollow workpiece, the workpiece including a sidewall having an interior-facing surface, an exterior-facing surface and an access opening formed therethrough, said contact surface being provided along a portion of said interior-facing surface spaced a distance from said access opening and wherein said exterior-facing surface defining a three dimensional target feature disposed in a predetermined relationship relative to said contact surface, the system including a controller, a component positioning unit and a component holding unit, the component holding unit including a component carriage for releasably supporting said component in movement from a supply position to an operating position wherein said component is moved into substantially juxtaposed contact with said contact surface, and a carriage support arm operable to move said component carriage between said supply and operating positions, the positioning unit including an optical scanner operable to scan a contour profile of at least part of the exterior-facing surface and to output signals to the controller representative of at least one of a direction and a distance of at least part of the target feature relative to the access opening, and wherein controller is operable to control movement of the carriage support arm in the movement of the component carriage to the operating position in response to the output signals.

In another aspect, the present invention resides in a hot plate welding system for melt connecting a component to a contact surface disposed along an interior of a hollow workpiece, the workpiece including a sidewall having an interior-facing surface, an exterior-facing surface and an access opening formed therethrough, said contact surface being provided along a portion of said interior-facing surface spaced a distance from said access opening and wherein said exterior-facing surface defining a three dimensional target feature generally aligned with said contact surface, the hot plate welding system including a workpiece melting unit having a hot plate support arm and an associated hot plate sized for at least partial insertion through said access opening, a component holding unit having a component carriage and carriage support arm sized for at least partial insertion through said access opening, and a positioning assembly for positioning at least one of said hot plate and said component carriage in substantially juxtaposed alignment with said contact surface, the hot plate being movable with said hot plate support arm between a retracted position moved from the workpiece interior, and a melt position wherein said hot plate is moved into juxtaposed contact with said contact surface the component carriage operable to releasably support said component and being movable with said carriage support arm between a supply position where the carriage is moved from the workpiece interior and an operating position wherein said carriage is moved to position said component when supported thereby in substantially juxtaposed alignment with said contact surface, the positioning assembly including a controller and an optical scanner, the optical scanner operable to scan a contour profile of at least part of the exterior-facing surface and provide output signals to the controller representative of at least one of a direction and distance of the target feature from a portion of the access opening, the controller being operable to control movement of at least one of the hot plate support arm and the carriage support arm to position the associated one of the hot plate and the component carriage in their respective melt position and the operating position in response to the output signals.

BRIEF DESCRIPTION OF THE DRAWINGS

Reference may now be had to the following detailed description taken together with the accompanying drawings, in which:

FIG. 2 shows an enlarged schematic view of the component holding unit and positioning unit used in the component coupling apparatus of FIG. 1;

FIG. 3 shows schematically the operation of the optical scanning unit used in positioning unit of FIG. 2 in the initial triangulation and calculation of a surface target feature relative to a workpiece access opening;

DETAILED DESCRIPTION OF THE PREFERRED EMBODIMENTS

Figure 1:
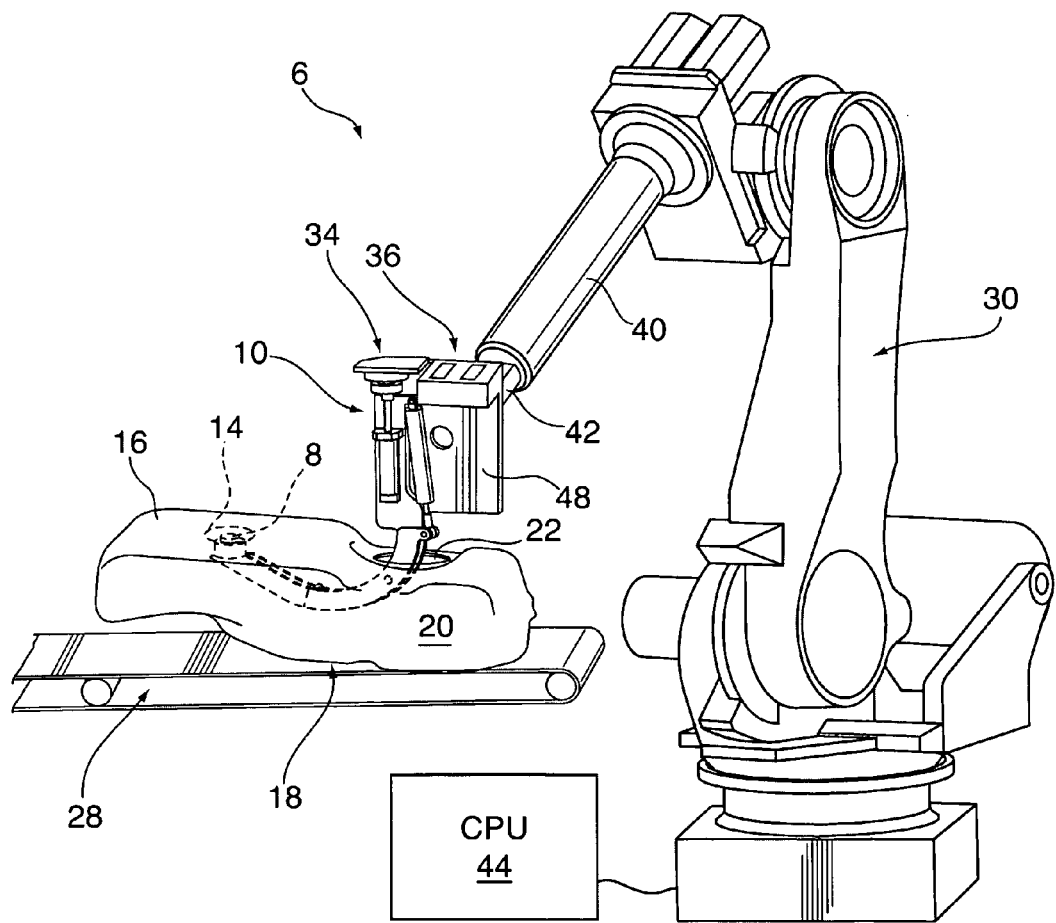
FIG. 1 shows a perspective view of a fuel tank assembly line incorporating component coupling apparatus for mounting of a valve component to an internal contact surface of blow molded fuel tank workpiece, in accordance with a preferred embodiment of the invention.

As will be disclosed, the present invention provides a component coupling apparatus 10 used in finished article manufacture in the securement of a variety of different types of components, including but not limited to valves, mounts, pipes, plugs or filler necks 8, to a desired contact surface 14 disposed along the interior of a hollow workpiece 18. As shown best in FIG. 1 workpiece 18 is formed as a blow molded construction having a unitary sidewall 16 and may for example, comprise a preform for a fluid reservoir or vehicle fuel tank. Although not essential, in a most preferred construction, the workpiece sidewall 16 is formed having a multilayer composite construction, and which incorporates both HDPE and EVOH layers. In the illustrated embodiment, a top side of the workpiece 18 is provided with an access opening 22 through the sidewall 16 which leads into a hollow interior 20, and which is spaced a desired distance from the contact surface 14.

Figure 4A:
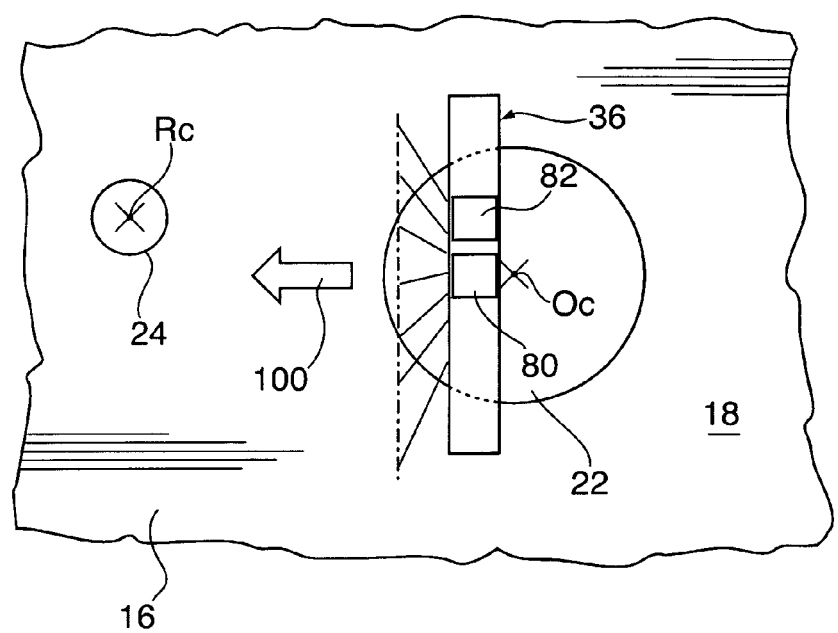
FIGS. 4a and 4b illustrate schematically the use of the optical scanning unit of FIG. 3 in the optical scanning and triangulation of the relative distance and direction vectors between a workpiece target locating ring and access opening.
Figure 4B:
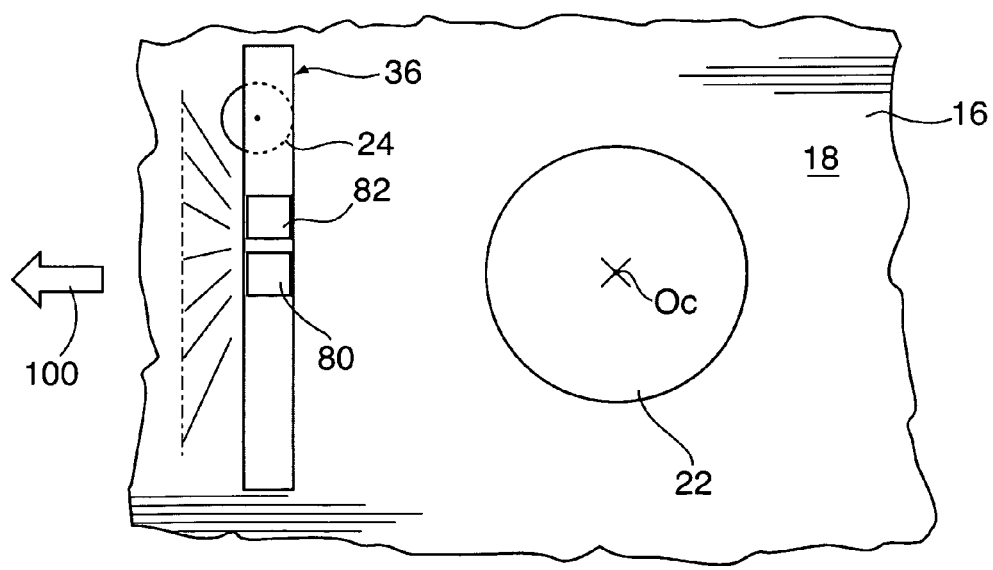
Figure 7:
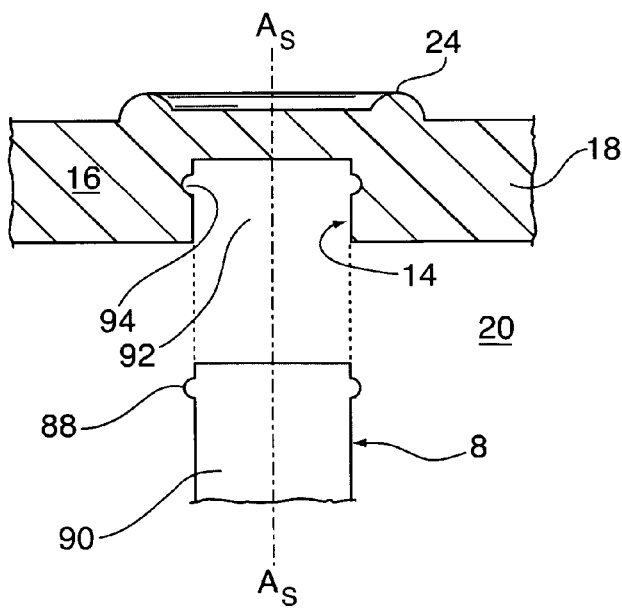
FIG. 7 shows an exploded view illustrating the mechanical coupling of the valve component to a complimentary shaped recess formed in the contact surface.

As shown best in FIGS. 4a and 7, a target locating ring 24 is integrally molded into the exterior of the top workpiece sidewall 16. The target ring 24 is formed as a raised circular rib having its radial center axially aligned with an approximately central portion of the contact surface 14 (axis $A_s$-$A_s$) against which a selected valve component 8 is to be mounted. While in a most simplified construction both the target ring 24 and access opening 22 are formed in a same top side of the workpiece 18, it is to be appreciated that the final positioning of the target ring 24 will depend on the location of the contact surface 14 relative to the workpiece interior 20.

FIG. 1 shows best the component coupling apparatus 10 used as part of a fuel tank assembly line 6 in accordance with a first preferred embodiment of the invention. In addition to the component coupling apparatus 10, the assembly line 6 includes a conveyor assembly or rotary indexing table 28 for conveying workpieces 18 into, and finished fuel tanks from the assembly line 6 as part of an automated manufacturing process. The apparatus 10 includes a robot 30, a component holding unit 34, and a positioning unit 36. As will be described, the positioning unit 36 is operable to affect the guidance and positioning of the component holding unit 34 to move the selected filler neck 8 to a mounting position moved against the contact surface 14 of the workpiece 18 in the manufacture of a finished fuel tank.

FIG. 1 shows best the robot 30 as including a robot arm 40 which is provided with a rotatable terminal most wrist 42, and which is adapted for controlled movement in six axis movement by way of a central processing unit (CPU) 44. Both the component holding unit 34 and component positioning unit 36 are mounted to a carriage plate 48 which is secured to the terminal-most wrist 42 of the robot arm 40. As will be described, the wrist 42 is selectively reciprocally moveable about a rotation axis $A_j$-$A_j$, whereby both the component holding unit 34 and positioning unit 36 are movable via the robot arm 40 in six axis movement, as well as rotatably about axis $A_j$-$A_j$.

In a simplified form, the carriage plate 48 is formed as generally planar rectangular aluminum or steel plate which is bolted directly on to the end of the robot arm wrist 42. Although not essential, the carriage plate 48 is most preferably fixedly secured to the wrist 42 at its geometric center, and in an orientation with the plate 48 extending in a plane generally normal to the wrist axis $A_j$-$A_j$.

FIG. 2 shows best the component holding unit 34 as including a component carriage 50 and a hooked or curved carriage support arm 52. The component carriage 50 is configured to selectively grip/transport and then release the valve component 8 in movement from a supply station (not shown) to the mounting position in juxtaposition with the contact surface 14 of a selected workpiece 18. In this regard, the component carriage 50 is coupled to a distalmost end of the carriage support arm 52. Both the component carriage 50 and carriage support arm 52 are sized for at least partial insertion through the access opening 22 so as to permit the selected valve component 8 to be moved thereby from the supply station (not shown) into the preform interior 20. Although not essential, the carriage support arm 52 is coupled for pivotal movement relative to the carriage plate 48 about a pivot 55. In this regard, in a preferred construction, the carriage support arm 52 is formed having a compound construction and includes a pair of ridged curved arm members 60a,60b which extend generally normal to the wrist axis $A_j$-$A_j$ in a substantially parallel arrangement to respective distal-most ends. The component carriage 50 is coupled between the distal-most ends, and includes opposing pairs of reciprocally movable gripping fingers 64 which are operable to selectively grasp and release the valve component 8 in its positioning and securement against the contact surface 14.

The carriage support arm 52 is pivotally mounted for movement relative to the carriage plate 48 in substantially the identical manner as described in commonly owned co-pending U.S. patent application Ser. No. 12/929,722, entitled "Hot Plate Welding System", the disclosure of which is incorporated herein in its entirety by reference. The carriage support arm 52 is furthermore movably secured to the carriage plate 48 by way of a slide plate 66. The carriage support arm 52 is pivotally coupled to the slide plate at the pivot 55, so as to be selectively movable between retracted position shown in FIG. 3, and the extended position shown in FIG. 2. The carriage support arm 52 is moved between the extended or retracted portions by way of a pneumatic ram 70. The selective movement of the carriage support arm 52 advantageously allows the carriage support arm 52 and component carriage 50 to be retracted inwardly towards the axis $A_j$-$A_j$ to provide the component holding unit 34 with a more compact radial profile when not in use. It is to be appreciated that in a more simplified construction, the pneumatic ram 70 could be omitted and carriage support arm 52 provided in a fixed orientation relative to the carriage plate 48.

The slide plate 66 slidably mounts the carriage support arm 52 and component carriage 50 to the carriage plate 48 for linear movement along a path tangential to the axis $A_j$-$A_j$. A slide actuator 72 is used to selectively effect carriage support arm 52 movement forwardly and rearwardly in linear movement between rest and biased positions. Both the pneumatic ram 70 and the slide actuator 72 are operable to effect movement of the carriage support arm 52 and slide plate 66, respectively, in response to control signals from the CPU 44. In a simplified construction, the slide actuator 72 may comprise an electric stepping motor or alternately a hydraulic or pneumatic ram.

Although not essential, most preferably a load sensor 76 is provided which is electronically coupled to the CPU 44, and which provides signals respecting sensed loads and/or pressures used to control slide plate movement between the rest biased positions. The load sensor in one simple form may be comprised of a spring-loaded contact plate which triggers an in-contact sensor when the valve component 8 is pressed against sidewall 16. Alternatively, the load sensor could include a load cell which provides an analog force feedback signal to the CPU 44 which can accurately calculate the actual force with which the valve component 8 is pressed against sidewall 16.

FIG. 2 shows the positioning unit 36 being secured to the carriage plate 48. The positioning unit 36 incorporates a three-dimensional laser scanner/digitizer 80 which incorporates an offset camera 82. Optionally a levelling unit 84 maybe provided for maintaining the scanner/digitizer 80 in a neutral orientation. As will be described the scanner/digitizer 80 is movable with the robot arm 40 over the exterior surface of the top of the workpiece sidewall 16. Although the scanner/digitizer 80 is provided preferably with an internal processor and memory and is in electronic communication with the CPU 44 (FIG. 1) and operates therewith to digitally scan, record and map the exterior surface features of the workpiece sidewall 16, the image processor could be external of the scanner/digitizer 80. The CPU 44 is furthermore provided with additional internal memory in which data representing the geometric profiles of both the access opening 22 as well as the target ring 24 is stored.

In the operation of the assembly line 6 shown in FIG. 1, a workpiece 18 is initially positioned on the conveyor assembly 28 within the working region of the robot 30, and with the access opening 22 and target ring 24 oriented upwardly. Concurrently with the workpiece 18 placement, the CPU 44 activates the robot 40 to move the component holding unit 34 to a component supply station (not shown) where a selected valve component 8 is retained by the component carriage 50 by the activation of the gripping fingers 64.

With the valve component 8 so held, the CPU 44 is initialized to move the robot arm 40 to an initial scanning position with the component coupling apparatus 10 suspended above an edge region of the workpiece 18. The wrist 42 is rotated to orient the positioning unit 36 so as to direct the scanner/digitizer 80 and downwardly towards the workpiece 18. Following movement to the scanning position, the robot arm 40 is actuated to move the positioning unit 36 horizontally over the sidewall 16 in the direction of arrow 100 (FIG. 3) while the laser scanner/digitizer 80 and camera 82 are is activated. The laser scanner/digitizer 80 is moved over and digitally scans each of the access opening 22 and target ring 24. As the scanner/digitizer scans the profile of the access opening 22, the scanned data is transmitted to the CPU 44, where it is compared with the pre-stored data. The CPU 44 identifies and logs the approximate geometric centre of the opening 22 $O_c$. Similarly, as the scanner/digitizer 80 scans the profile of the target ring 24, the CPU 44 compares the scanned data with pre-stored data to verify and log the position of radial center of the target ring 24, and calculate both the distance and directional vectors between the center $O_c$ of the access opening 22 and the radial center $R_c$ of the target ring 24.

Following scanning operations, the CPU 44 activates the pneumatic ram 70 to extend the carriage support arm 52. The robot 30 is concurrently activated to move the robot arm 40 and wrist 42 to position the component carriage 50 in pre-insertion position shown in FIG. 5. The CPU 44 preferably is used to control the final arm 40 and wrist 42 movement having regard to both pre-stored geometry data respecting the carriage support arm 52, and the logged data respecting the geometric centre of the access opening 22, so that in the pre-insertion position, the component carriage 50 is in direct alignment with the center $O_c$ of the opening 22. Following the pre-positioning, the CPU 44 activates the robot arm 40 and wrist 42 to move into the component carriage 50 into interior 20 by simultaneously moving downwardly in the direction of arrow 150 and rotating forwardly in the direction of arrow 200. The CPU 44 controls the movement of the robot arm 40 to position the component carriage 50 in a pre-mounting position directly aligned with central axis $A_s$-$A_s$ (FIG. 7) of the contact surface 14. Control of the robot arm 40 movement is effected having regard to the stored carriage support arm 52 geometry and are calculated distance and in the vector directions to the center of the target ring 24.

Figure 6:
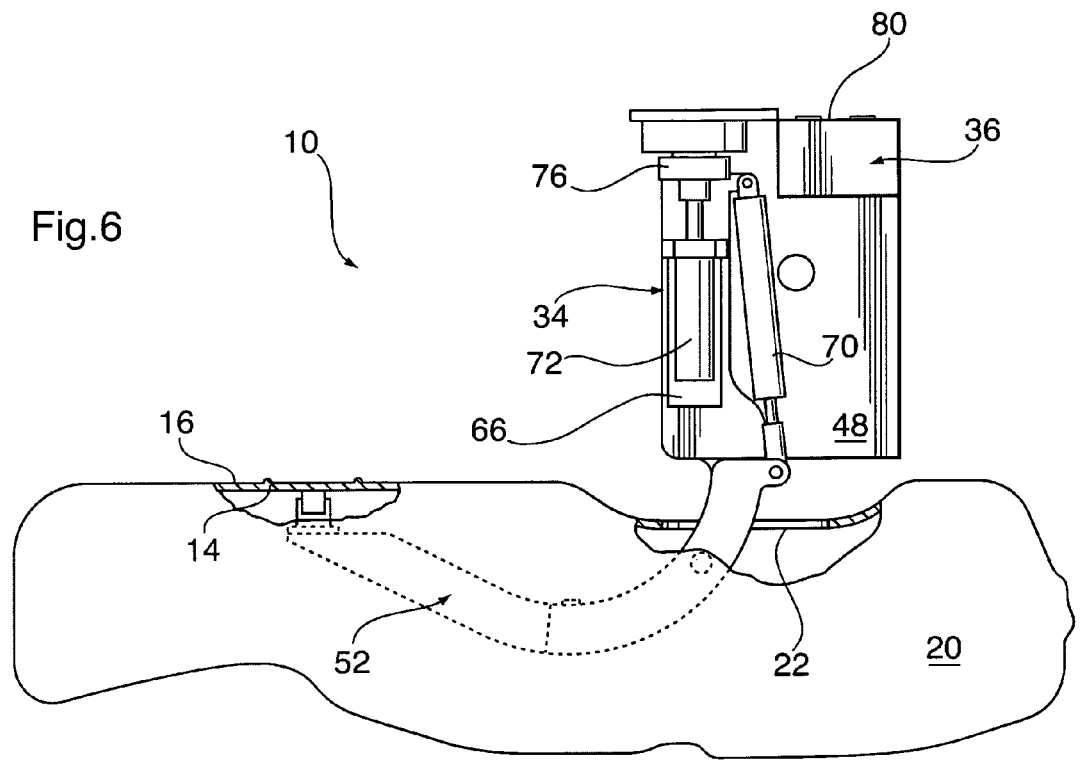
FIG. 6 illustrates schematically the component holding unit of FIG. 5 in the final positioning of a valve component against an interior contact surface of the workpiece.

Once moved to the pre-mounting position, the slide plate 66 is activated to move the component carriage 50 upwardly towards the contact surface 14, bringing the valve component 8 into coupling engagement therewith, in the position shown in FIG. 6. Following either predetermined period of time where adhesives are used to component coupling, and/or on sensing a pre-selected load in the case of mechanical or heat melt coupling, the valve component 8 is released by the gripping fingers 64 and the load sensor 76 signals the slide actuator 72 to return the slide plate 66 to a deactivated position.

The CPU 44 next effects the rotation and raising of the robot arm 40 and wrist 42 in the reverse direction of arrows 150, 200 to withdraw the component carriage 50 carriage support arm 52 from the preform interior 20.

The robot wrist 42 is then rotated to reorient the scanner/digitizer 80 and camera 82 downwardly for assembly of a next article.

In a most simplified method, the valve component 8 is coupled to the contact surface 14 in a friction or mechanical fit arrangement. As shown best in FIG. 7, a locking rib 88 may be provided extending radially about an end portion 90 of the component 8. The end portion 90 and rib and ring 88 are sized respectively for mated engagement within a respective complimentary sized socket 92 and annular groove 94 formed in the contact surface, to secure the valve component 8 thereto in a snap-fit arrangement.

Figure 8:
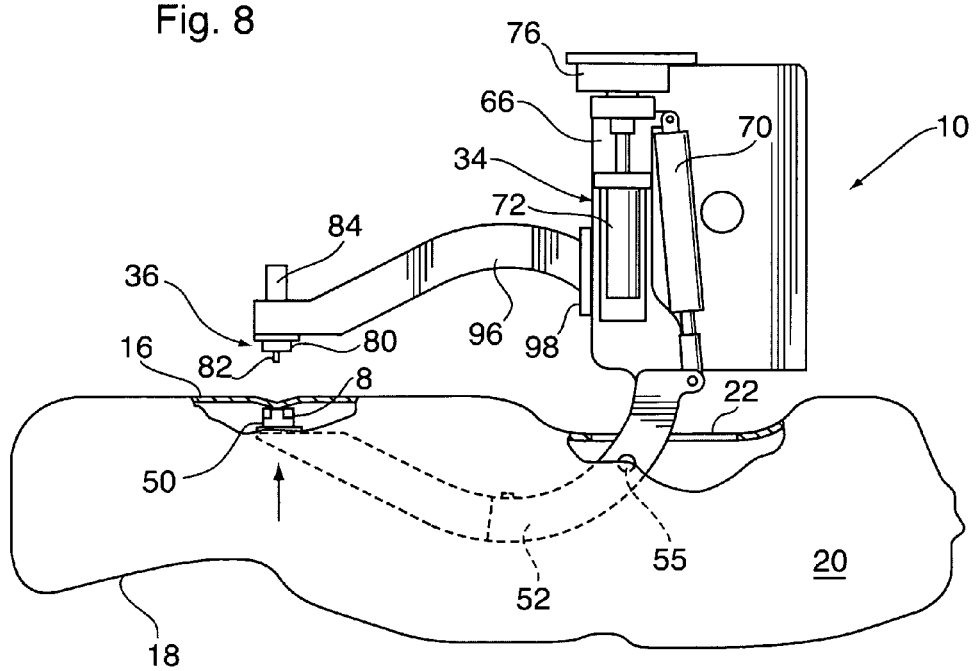
FIG. 8 shows a partial perspective view of a component coupling apparatus used in the positioning and securement of a component to an internally disposed workpiece contact surface in accordance with a second embodiment of the invention.
Figure 9:
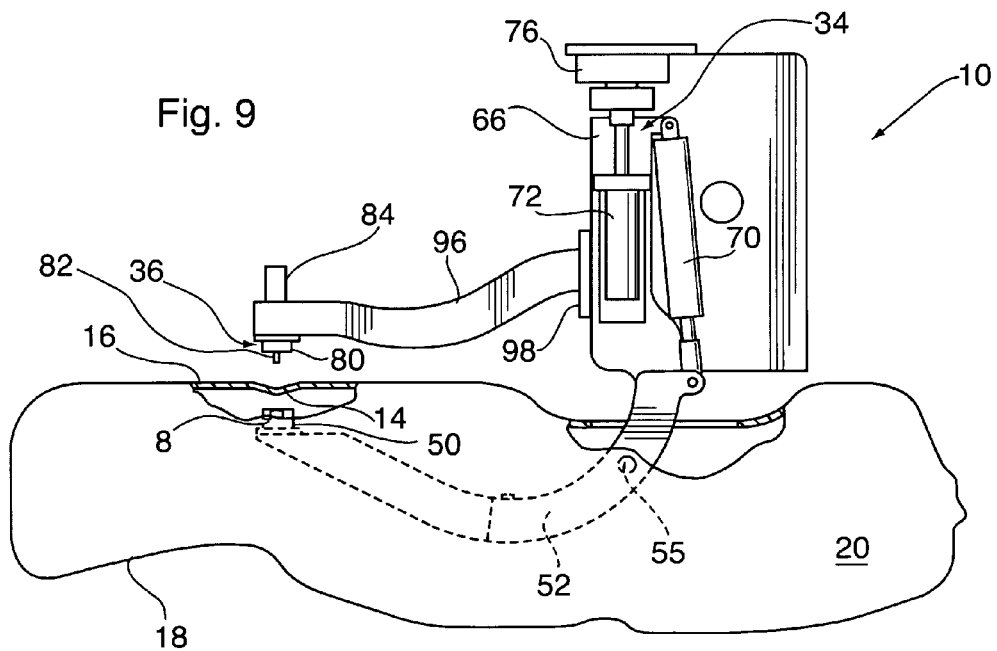
FIG. 9 shows a partial perspective view of a component coupling apparatus used in the positioning and securement of a component to an internally disposed workpiece contact surface in accordance with a third embodiment of the invention.

While the embodiment described with reference to FIGS. 1 to 6 show an apparatus 10 adapted to digitally scan and then position a valve component 8 as part of a two step process. The invention is not so limited. Reference may be had to FIGS. 8 and 9 which illustrate further embodiments of a component coupling apparatus 10 wherein like reference numerals are used to identify like components.

In FIGS. 8 and 9, the component coupling apparatus 10 is adapted for the substantially simultaneous scanning and identification of the target ring 24 (FIG. 1) concurrently with valve component 8 positioning. In particular, in the apparatus 10 shown in FIG. 8, a pair of support arms 52,96 is provided for movably support respectively the component carriage 50 and the scanner/digitizer 80. The support arms 52,96 are shown as extending in a generally coplanar arrangement. The support arm 96 is spaced a minimum distance above the component carriage 50 and has curvature selected to allow for the concurrent movement of the scanner/digitizer 80 over the exterior of top workpiece sidewall 16, whilst the selected valve component 8 is concurrently moved through the workpiece interior 20 between the pre-insertion and mounting positions. Although not essential, to allow greater apparatus versatility, the support arm 96 maybe mounted on a slide assembly 98 allowing the arm 96 to be selectively raised from or lowered towards the workpiece 18, depending on final workpiece geometry.

It is to be appreciated that the embodiment in FIGS. 8 and 9, the scanned data is provided to the CPU 44 from the scanner/digitizer 80 permits substantially real-time control and positioning of the carriage support arm 52 and component carriage 50 as the access opening 22 and the target ring 24 are scanned and identified.

It is appreciated that other methods of securing the valve component 8 to the contact surface 14 are also possible. By way of non-limiting example, the apparatus 10 in FIG. 1 could also be used to position components within the workpiece interior 20 by chemical adhesion, or alternately, following partial melting of the component and/or the contact surface 6. In one possible alternate arrangement, the conveyor assembly line 28 could be provided with a dedicated workpiece melting unit adapted to partially melt or soften of the interior contact surface 14 prior to component positioning. Such a workpiece melting unit could be provided on a dedicated robot as a stand alone unit.

Figure 10:
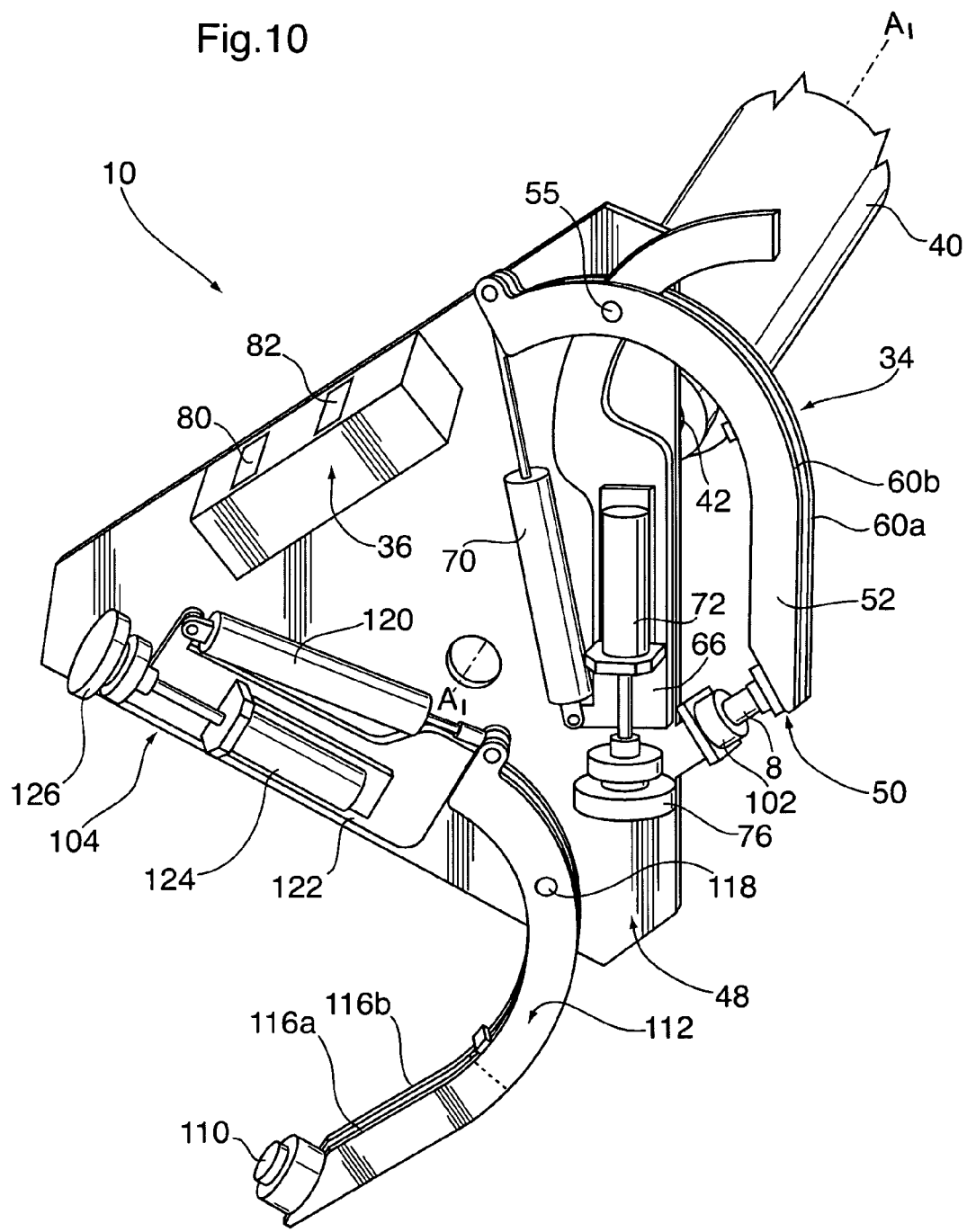
FIG. 10 shows a perspective view of a hot plate welding system used in the positioning and securement of a component to an internal contact surface of a hollow workpiece in accordance with a fourth embodiment of the invention.

Alternatively, reference may be had to FIG. 10 which shows a further embodiment of the invention for use in the assembly line 6 of FIG. 1, and in which like reference numerals are used to identify like components. In FIG. 10, the component coupling apparatus 10 incorporates a triangular shaped carriage plate 48 secured to the end of the robot arm 40 and wrist 42. In FIG. 10, the component holding unit 34 and component positioning unit 36 are mounted respectively along one associated triangle side. The component holding unit 34 preferably also includes a hot plate 102 which is positioned so as to be engagable to partially melt the valve component 8, while the carriage support arm is mounted to fully retracted position shown.

In addition, a workpiece melting unit 104 is further provided along the third triangle side. FIG. 10 shows the workpiece melting unit 104 as including a hot plate 110 and a hot plate support arm 112. Although not essential, the hot plate support arm 112 is most preferably provided with and mounted in a similar configuration as the carriage support arm 52. In this regard, the hot plate support arm 112 is formed from a pair of generally aligned hooked-shaped rigid arm members 116a,116b which extend in a plane generally normal to the axis robot arm $A_I$-$A_I$. The hot plate 110 is mounted to distal most portions of the arm members 116a,116b. As with the component holding unit 34 and carriage support arm 52, the hot plate 110 and hot plate support arm 112 have a size selected to permit their substantially unhindered sliding insertion through a workpiece access opening 22 into general alignment with the contact surface 14 (FIG. 1).

Although not essential, the hot plate support arm 112 is preferably also mounted for selective movement about a pivot 118 between a retracted position and the extended position shown in FIG. 10, where the hot plate 110 is moved radially outwardly from the axis $A_I$-$A_I$. An associated pneumatic ram 120 is provided and controlled by the CPU 44 (FIG. 1) to control support arm 112 movement.

The workpiece melting unit 104 similarly includes a linear slide plate 122, slide actuator 124, and load sensor 126. Preferably the slide actuator 124 and sensor 126 are also in electronic communication with the CPU 44 and are of the identical construction of the slide actuator 72 and sensor 76. The associated load sensor 126 is operable to provide control signals to the CPU 44 to effect linear displacement of the slide plate 122 relative to the carriage plate 48, along an associated tangential path.

In use of the apparatus 10 in FIG. 10, the CPU 44 is initially activated to scan the top exterior of a workpiece sidewall 16 in the same manner as described with reference to FIG. 1. As the scanner/digitizer 80 moves across the exterior of the sidewall 16, the scanner/digitizer 80 scans and digitally compares the surface features of the sidewall with the prerecorded features stored in the CPU memory. On recognizing each of the access opening 22 and target ring 24 profiles, the CPU logs 44, and calculate both the distance and directional vectors between the approximate center $O_c$ of the access opening 22 and the radial center $R_c$ of the target ring 24. Following scanning and the comparison of geometric data with data pre-stored in the CPU 44, the CPU 44 activates pneumatic ram 120 to extend the hot plate support arm 112 while moving the robot arm 40 and wrist 42 to position the hot plate 110 directly above the access opening 22. It is to be appreciated that depending on processing speed; the scanned data may be compared with pre-stored data either in substantially real-time, or following the completion of scanning operations.

Figure 5:
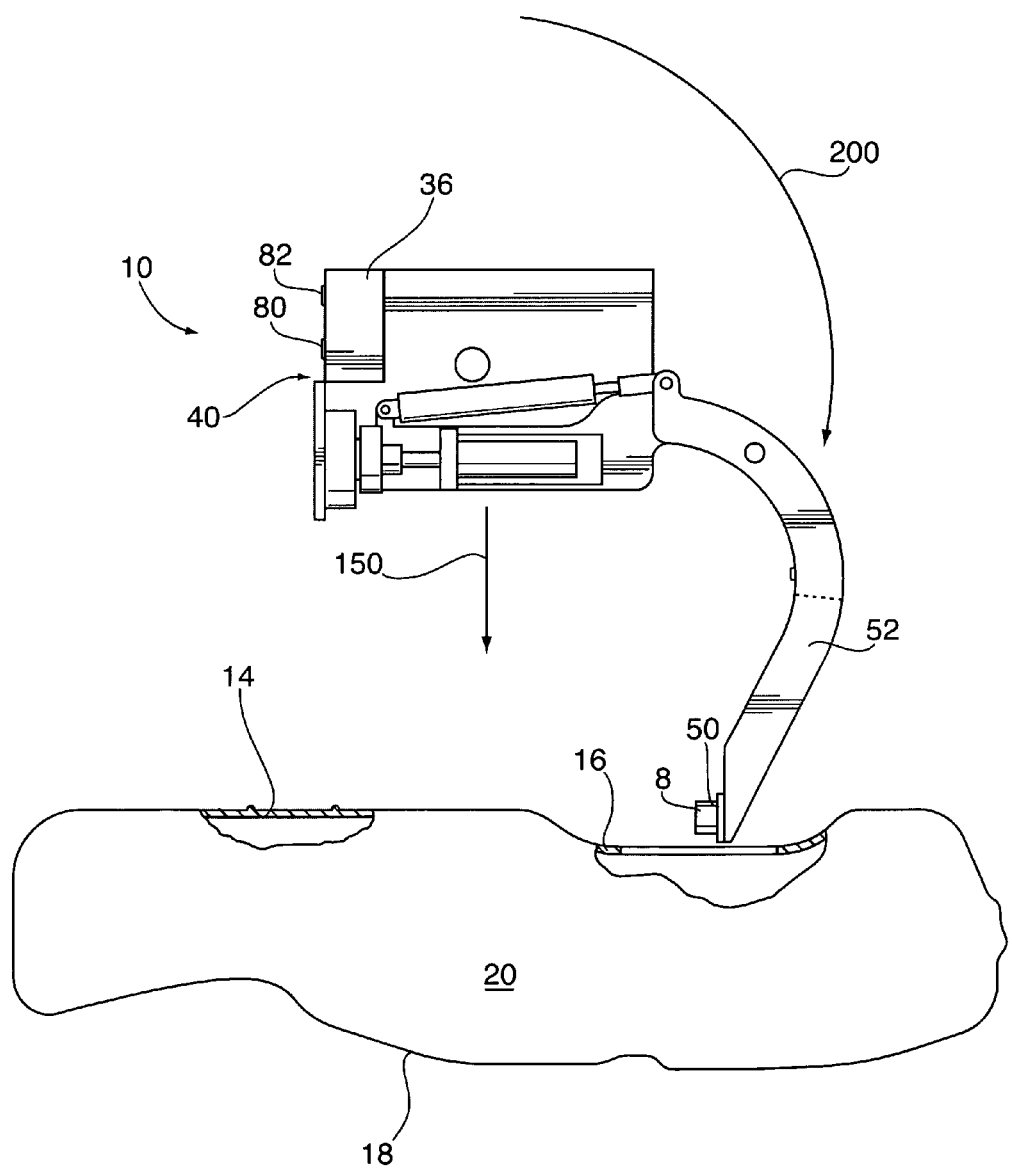
FIG. 5 illustrates schematically the position of component holding unit of FIG. 1 in initial movement of the valve component into the workpiece interior.

The CPU 44 next actuates the robot arm 40 and wrist 42 in movement rotating the hot plate downwardly and forwardly in the same directions as arrows 150, 200 shown in FIG. 5 to orient the hot plate 110 in a pre-melt position axially aligned with the contact surface 14. Once so positioned, the CPU 44 is used to activate the slide activator 124 to move the hot plate 110 into melt contact with the contact surface 14. Concurrently, the hot plate 102 is activated and the carriage support arm 52 is moved to bring a filler neck 8 retained in the carriage 50 into contact therewith. Following desired melting of the contact surface 14, the load sensor 126 signals the CPU 44, which in turn activates the robot 30 to withdraw the workpiece melting unit 104 from the workpiece interior 20 in the reverse direction. Following withdrawal of the hot plate 110 from the interior 20, the ram 120 is operated to retract the hot plate support arm 112. The component holding unit 34 is activated to effect the positioning of the valve component 8 against the partially melted contact surface 14. With the carriage support arm 52 extended, the robot arm 40 and wrist 42 position the valve component 8 directly above the logged center $O_c$ of access opening 22. With the valve component 8 retained by the component carnage 50, the CPU 44 again effects the compound movement or the robot arm 40 and wrist 42 in the direction of arrow 150, 200 (FIG. 5) to move the component holder 50 into the interior 20 of the workpiece rotating downwardly and forwardly. Simultaneously with downward and forward movement, the CPU 44 repositions the component holder 50 from the access opening 22 into the pre-mount position, aligned with the target ring 24 center $R_c$, and thus the contact surface 14, by moving the calculated distance and vector directions.

Following positioning of the valve component 8 in the pre-mount position, the slide actuator 72 is activated moving the component carriage 50 and melted end of valve component 8 into an abutting contact with the melted contact surface 14, and allowed to cool, fusing thereto. After predetermined period of time and/or on the load sensor 76 sensing a preselected load, the valve component 8 is released from the component carriage 50 and the CPU 44 signals the slide actuator 72 to return the slide plate to its retracted position. The CPU 44 then activates the robot 30 to rotate and raise the robot arm 40 and wrist 42 in the reverse direction to effect the sliding withdrawal of the component carriage 50 and carriage support arm 52 from the workpiece interior 20.

Although in FIG. 2 the support arm 52 is shown as mounting a component carriage, it is to be appreciated that the apparatus of FIG. 2 could be modified whereby a hot plate is secured to the support arm 52.

Although the detailed description describes the workpiece preform 18 as formed with a target ring 24, the invention is not so limited. It is to be appreciated that target features having a variety of different shapes and/or features could also be used. More preferred target features include without restriction other geometrically or predetermined shaped protrusions, recesses, or other textural features which may be suitable for optical scanning and/or triangulation.

Similarly, although the positioning of a target ring 24 in axially alignment with the contact surface 14 provides a simplified construction, the invention is not so limited. It is to be appreciated that one or more target features could be provided along the exterior sidewall 16 of the workpiece 18 in a predetermined, non-aligned orientation from the contact surface 14. In such a use, suitable algorithm is provided to locate the component holding unit 34 and/or workpiece melt unit 40 having regard to the spacial relationship existing therebetween.

Although the detailed description described the use of the apparatus 10 in the positioning of a valve component 8 along the interior of a hollow fuel tank workpiece 18, the invention is not so limited. If desired, the present invention could equally be used to partially hot melt and/or mount components to contact surfaces provided along the top exterior and/or underside of a variety of different types of injection molded, press molded and/or blow molded workpieces.

While the present invention is described as used in the mounting of a valve component 8 within the interior of a fuel tank preform, it is to be appreciated that the present system may be used to position a variety of different types of components to numerous different types of workpieces. More preferred workpieces to be used in the present system include without restriction, fluid reservoirs and in particular, washer fluid, brake fluid and antifreeze reservoirs for vehicle applications. More preferred components to be used therein would include without restriction, vent nipples, seal plugs, brackets and the like.

Although the detailed description describes and illustrates various preferred embodiments, the invention is not so limited. Many modifications and variations will now occur to persons skilled in the art. For a definition of the invention, reference may be had to the appended claims.

We claim:

1. A component coupling system for connecting a component to a contact surface of a hollow workpiece, the workpiece including a sidewall having an interior-facing surface, an exterior-facing surface and an access opening formed therethrough, said contact surface being provided along a portion of said interior-facing surface spaced a distance from said access opening and wherein said exterior-facing surface defining a three dimensional target feature disposed in a predetermined relationship relative to said contact surface, the system including a controller, a component positioning unit and a component holding unit, the component holding unit including a component carriage for releasably supporting said component in movement from a supply position to an operating position wherein said component is moved into substantially juxtaposed contact with said contact surface, and a carriage support arm operable to move said component carriage between said supply and operating positions, the positioning unit including an optical scanner operable to scan a contour profile of at least part of the exterior-facing surface and to output signals to the controller representative of at least one of a direction and a distance of at least part of the target feature relative to the access opening, and wherein controller is operable to control movement of the carriage support arm in the movement of the component carriage to the operating position in response to the output signals.

2. The system of claim 1 wherein the target feature is substantially directly aligned with the contact surface.

3. The system of claim 2 wherein the signals output by the optical scanner are representative of the both the direction and the distance of the target feature from a substantially center portion of the access opening.

4. The system as claimed in claim 1 further including:
a robot having a movable robot arm and carriage plate secured to the robot arm,
the carriage support arm having a hooked profile and being mounted to the carriage plate for movement therewith, and
the carriage support arm sized for at least partial insertion through said access opening.

5. The system as claimed in claim 2 wherein the controller is operable to control movement of the carriage support arm in substantially real time as the optical scanner scans the contour profile.

6. The system as claimed in claim 5 wherein the positioning unit includes a scanner support arm mounted to the carriage plate for movement therewith, the scanner support arm extending in a predetermined relation to the carriage support arm.

7. The system as claimed in claim 2 wherein the optical scanner is coupled to the component holding unit for movement therewith.

8. The system as claimed in claim 2 wherein the contact surface comprises a ribbed recess formed in said interior surface, and said target feature comprising a raised projection having a generally complimentary profile to said recess.

9. The system as claimed in claim 1 wherein said target profile comprises a raised ring integrally molded into said exterior-facing surface, and wherein the output signals are representative of the direction and distance of a central portion of the raised ring from a substantially central portion of the access opening.

10. The welding system as claimed in claim 1 wherein the workpiece comprises a hollow blow molded gas tank preform having an interior cavity delineated by a multilayer sidewall, the sidewall including an EVOH layer and an innermost HDPE layer, the contact surface disposed at said innermost HDPE layer, and said part of the component comprises an HDPE part.

11. The system of claim 10 said target feature comprises a raised member having a preselected geometric profile.

12. A hot plate welding system for melt connecting a component to a contact surface disposed along an interior of a hollow workpiece, the workpiece including a sidewall having an interior-facing surface, an exterior-facing surface and an access opening formed therethrough, said contact surface being provided along a portion of said interior-facing surface spaced a distance from said access opening and wherein said exterior-facing surface defining a three dimensional target feature generally aligned with said contact surface, the hot plate welding system including a workpiece melting unit having a hot plate support arm and an associated hot plate sized for at least partial insertion through said access opening, a component holding unit having a component carriage and carriage support arm sized for at least partial insertion through said access opening, and a positioning assembly for positioning at least one of said hot plate and said component carriage in substantially juxtaposed alignment with said contact surface, the hot plate being movable with said hot plate support arm between a retracted position moved from the workpiece interior, and a melt position wherein said hot plate is moved into juxtaposed contact with said contact surface the component carriage operable to releasably support said component and being movable with said carriage support arm between a supply position where the carriage is moved from the workpiece interior and an operating position wherein said carriage is moved to position said component when supported thereby in substantially juxtaposed alignment with said contact surface, the positioning assembly including a controller and an optical scanner, the optical scanner operable to scan a contour profile of at least part of the exterior-facing surface and provide output signals to the controller representative of at least one of a direction and distance of the target feature from a portion of the access opening, the controller being operable to control movement of at least one of the hot plate support arm and the carriage support arm to position the associated one of the hot plate and the component carriage in their respective melt position and the operating position in response to the output signals.

13. The welding system of claim 12 wherein the workpiece has a substantially integral sidewall and is selected from a blow molded fuel tank and a blow molded fluid reservoir,
said component comprising a plastic component selected from the group consisting of a bracket, a mount, a seal plug, a vent nipple, a filler neck and a vent valve or other valve component.

14. The welding system of claim 12 wherein the target feature is substantially aligned with the contact surface, said target feature having a preselected geometric profile.

15. The welding system of claim 12 wherein the controller is operable to control movement of both the hot plate support arm and the carriage support arm in response to the output signals.

16. The welding system of claim 15 further including a robot having a robot arm and a robot drive for selectively moving the robot arm, each of the hot plate support arm and carriage support arm being coupled to the robot arm for movement therewith, and wherein the controller is operable to selectively actuate said robot drive in response to the output signals.

17. The welding system as claimed in claim 12 wherein the optical scanner comprises a 3D laser scanner.

18. The welding system as claimed in claim 12 further including:
a robot having a movable robot arm and carriage member secured to the robot arm,
the component support arm having a hooked profile and being mounted to the carriage member for movement therewith, and wherein the component carriage and component the support arm is sized for at least partial insertion through said access opening.

19. The welding system as claimed in claim 18 wherein the controller is operable to control movement of the carriage support arm in substantially real time as the scanner scans the contour profile.

20. The welding system as claimed in claim 19 wherein the positioning unit includes a scanner support arm mounted to the carriage member for movement therewith, the scanner support arm extending in a generally coplanar relation to the component support arm.

21. The welding system as claimed in claim 12 wherein the workpiece comprises a hollow blow molded gas tank having an interior cavity delineated by a multilayer sidewall, the sidewall including an EVOH layer and an innermost HDPE layer, the contact surface disposed at said innermost HDPE layer, and said part of the component comprises an HDPE part.

* * * * *